(No Model.)
E. DARK, D. COLLINS, & G. W. NELSON.
Combined Harrow, Marker, and Cultivator.
No. 228,612.          Patented June 8, 1880.
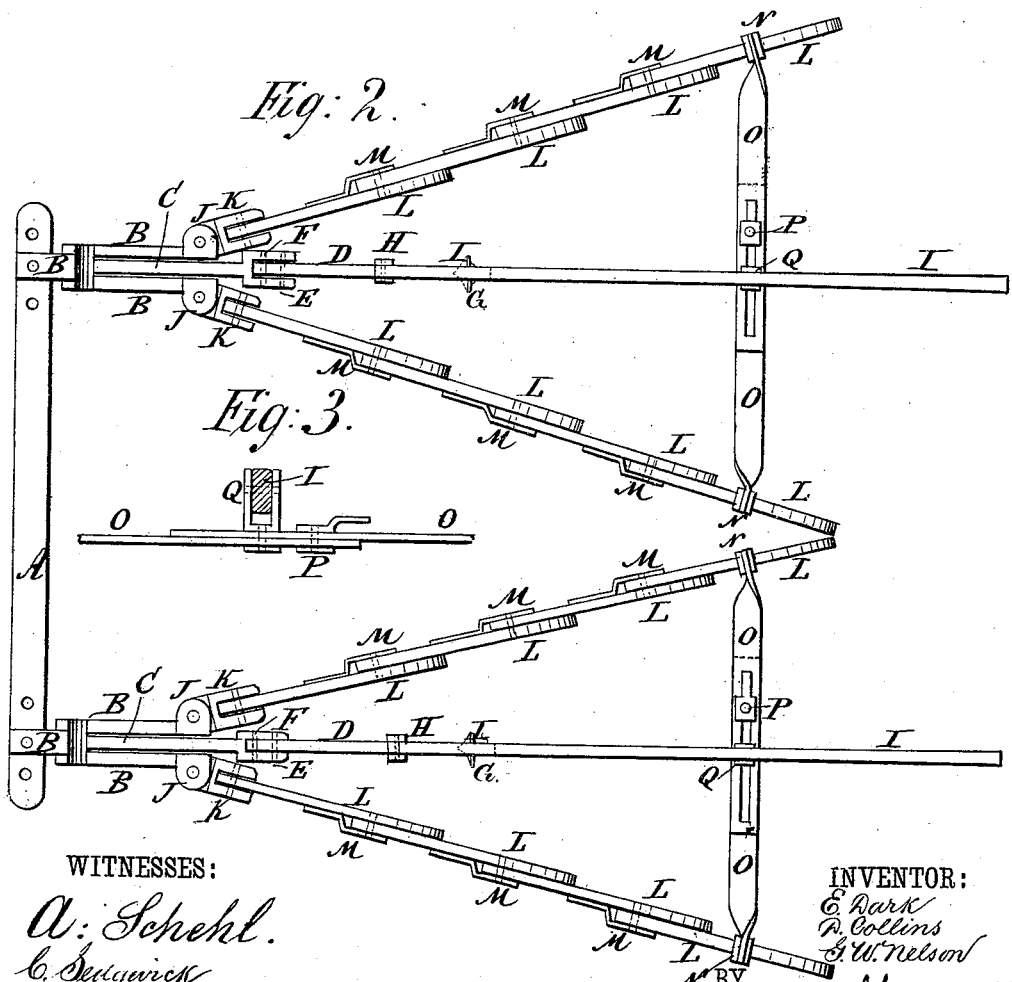
WITNESSES:
A. Schehl.
C. Sedgwick.
INVENTOR:
E. Dark
D. Collins
G. W. Nelson
BY
Munn & Co.
ATTORNEYS.

UNITED STATES PATENT OFFICE.

ELIZABETH DARK, DAVIS COLLINS, AND GEORGE W. NELSON, OF QUITMAN, MISSOURI.

COMBINED HARROW, MARKER, AND CULTIVATOR.

SPECIFICATION forming part of Letters Patent No. 228,612, dated June 8, 1880.

Application filed April 5, 1880. (No model.)

*To all whom it may concern:*

Be it known that we, ELIZABETH DARK, DAVIS COLLINS, and GEORGE W. NELSON, of Quitman, in the county of Nodaway and State of Missouri, have invented a new and useful Improvement in Combined Harrow, Marker, and Cultivator, of which the following is a specification.

Figure 1 is a side elevation of the improvement. Fig. 2 is a plan view. Fig. 3 is a rear view of the middle part of the arch, the handle being shown in cross-section.

Similar letters of reference indicate corresponding parts.

The object of this invention is to furnish a combined harrow, marker, and cultivator so constructed as to harrow the ground and at the same time mark the ground for planting, and also to cultivate the plants, and which shall be simple in construction, convenient in use, and not liable to break or get out of order.

A is a draft-bar, which serves as a doubletree, and also as a width-regulator. In the end parts of the bar A are formed a number of holes to receive the whiffletree-clevises, and also to receive the bolts by which the said bar is secured in and to the forked forward ends of the bars or beams B. The forward ends of the beams B are bent upward and forward to raise the bar A above plants and any projecting obstructions. The rear parts of the beams B are slotted longitudinally and vertically to receive the beams C, the forward ends of which are pivoted to the said beams B. The rear ends of the beams C are slotted to receive the forward ends of the curved standards D, which are secured to the beams C by bolts E and wooden pins F, so that should the markerplows G, attached to the lower ends of the standards D, strike an obstruction the wooden pins F will break and allow the plows G to swing back to prevent the machine from being broken.

To the bends of the standards D are pivoted the slotted lower ends of the short couplingbars H, to the slotted ends of which are pivoted the forward ends of the handles I. The rear parts of the handles I are supported by arches, hereinafter described.

Upon the outer sides of the rear ends of the coupling-beams B are formed slotted and perforated lugs J, to which are hinged the forward ends of the coupling-blocks K in such a manner that the rear ends of the said couplingblocks will have a free lateral movement. The rear ends of the coupling-blocks K are slotted vertically to receive the forward ends of the forward harrow-teeth, L, so that the rear parts of the said harrow-teeth may have a free vertical movement.

With this construction the series of harrowteeth may be adjusted to make the harrow wider or narrower without causing the forward harrow-teeth to bind.

To the outer side of the bend of each harrowtooth, except the rear tooth of each series, is attached the forward end of a strap or halfkeeper, M, to and between the rear end of which and the said tooth is pivoted the forward end of the next rear tooth in the series.

The forward parts of the harrow-teeth L are straight, and when the harrow is under a draftstrain are horizontal. The rear parts of the harrow-teeth L are curved downward to bring them into proper working position.

To the bend of the rear tooth of each series is pivoted the lower end of a coupling-block, N, to the upper end of which is pivoted the lower end of a bar, O. The bars O are arranged in pairs, and are curved upward and inward, so that the inner ends of the bars of each pair may overlap each other, forming an arch.

The overlapped ends of the bars O are slotted longitudinally to receive the bolts P, by which they are secured together, so that by loosening the nuts of the bolts P the rear ends of the series of harrow-teeth L of each pair can be adjusted wider apart or closer together, as may be required.

The pairs of series of harrow-teeth are adjusted wider apart or closer together by adjusting the connecting-beams B upon the draftbar A. In the slot in the overlapped ends of the bars O of each pair is swiveled a bolt, Q, in the slotted head of which is pivoted the handle I, so that the handles I may be free to move as the bars O are adjusted.

By this construction each harrow-tooth L will be free to rise in passing over an obstruction without raising any of the other teeth from the ground.

With this construction the machine will harrow the ground and at the same time mark it for planting, and by adjusting the pairs of series of harrow-teeth at a proper distance apart the machine may be used for cultivating plants planted in rows and drills.

Having thus described our invention, we claim as new and desire to secure by Letters Patent—

1. A combined harrow, marker, and cultivator, constructed substantially as herein shown and described, consisting of the draft-bar A, the bent and slotted connecting-beams B, the markers C D G, the hinged coupling-blocks K, the series of curved harrow-teeth L, the adjustable arches O, and the handles I, as set forth.

2. In a combined harrow, marker, and cultivator, the combination, with the draft-bar A, the marking-plows C D G, and the series of curved harrow-teeth L, of the bent and slotted connecting-beams B, having lugs J and the hinged coupling-blocks K, substantially as herein shown and described, whereby the draft-bar, marking-plows, and harrow-teeth are connected adjustably and flexibly, as set forth.

3. In a combined harrow, marker, and cultivator, the combination of the handles I, the hinged coupling-bars H, and the swiveled bolts Q, with the marking-plows C D G and the arched connecting-bars O, substantially as herein shown and described, whereby the handles can accommodate themselves to the adjustment of the series of harrow-teeth L, as set forth.

ELIZABETH DARK.
DAVIS COLLINS.
GEORGE W. NELSON.

Witnesses:
S. R. BEECH,
WILL R. GAY.